United States Patent [19]

Garofalo et al.

[11] Patent Number: 4,924,580
[45] Date of Patent: May 15, 1990

[54] SKEWED FILLET WELD GAUGE

[76] Inventors: Mel V. Garofalo, 18-11 123 St., College Point, N.Y. 11356; William J. Taylor, 30 East Ave., Walden, N.Y. 12586; Wayne T. Rheaume, 37 Fletcher Dr., Newburgh, N.Y. 12550

[21] Appl. No.: 140,548

[22] Filed: Jan. 4, 1988

[51] Int. Cl.⁵ .......................... G01B 5/02; G01B 5/20
[52] U.S. Cl. ....................................... 33/832; 33/561.1
[58] Field of Search ................. 33/169 D, 169 B, 175, 33/530, 551, 552, 557, 546, 667

[56] References Cited

U.S. PATENT DOCUMENTS

| | | | |
|---|---|---|---|
| 438,401 | 10/1890 | Brown | 33/175 |
| 440,621 | 11/1890 | Gurran | 33/169 B |
| 2,650,435 | 9/1953 | Kidd | 33/169 B |
| 3,481,041 | 12/1969 | Oakes | 33/552 |
| 4,637,142 | 1/1987 | Baker | 33/169 D |
| 4,700,487 | 10/1987 | Bogle | 33/175 |

FOREIGN PATENT DOCUMENTS

| | | | |
|---|---|---|---|
| 626528 | 2/1936 | Fed. Rep. of Germany | 33/169 D |
| 203464 | 3/1939 | Switzerland | 33/169 D |
| 574729 | 1/1946 | United Kingdom | 33/175 |

Primary Examiner—William A. Cuchlinski, Jr.
Assistant Examiner—Patrick R. Scanlon

[57] ABSTRACT

Fillet weld inspection and measuring device having a plurality of individually displaceable parallel aligned slide members disposed in covered grooves in a base plate.

5 Claims, 2 Drawing Sheets

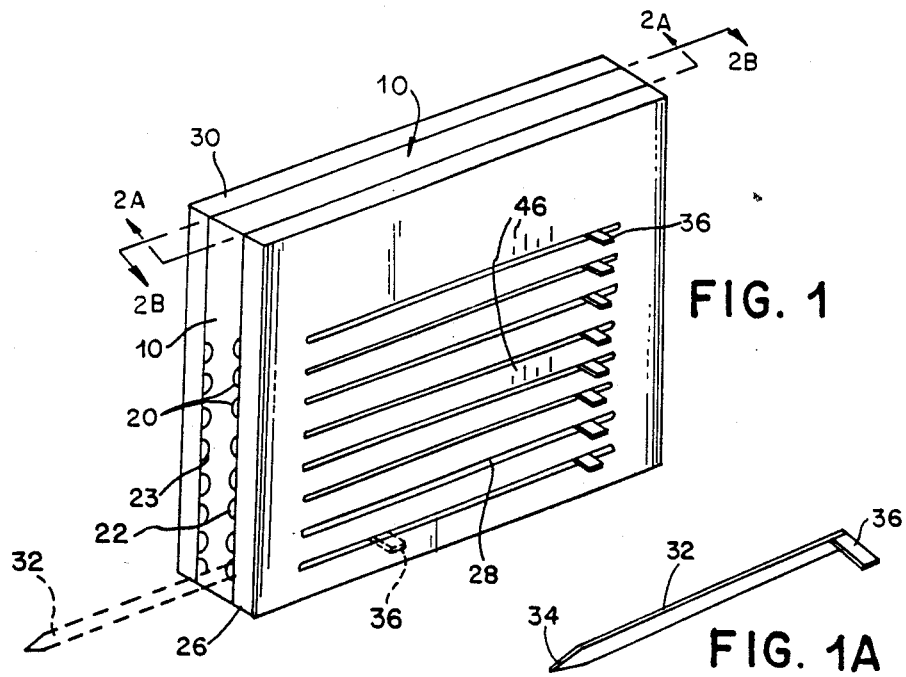
FIG. 1
FIG. 1A
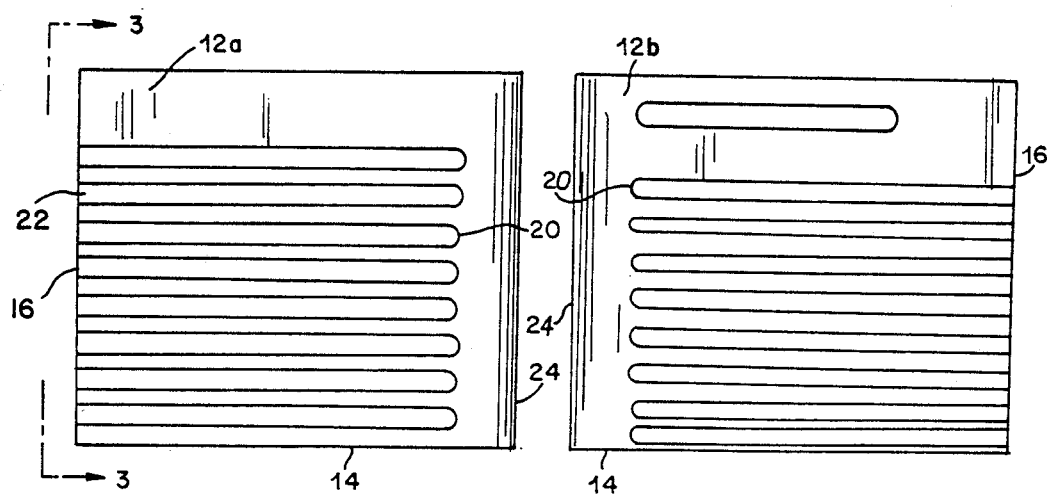
FIG. 2A
FIG. 2B
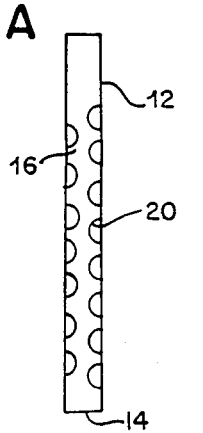
FIG. 3

SKEWED FILLET WELD GAUGE

This invention relates to measuring devices for fillet welds and particularly to an improved construction for a fillet weld inspection and measuring device.

BACKGROUND OF THE INVENTION

Fillet welds are conventionally employed to join angularly offset elements, usually of planar surface character, to each other. The strength of such a weld is roughly determined by its cross-sectional area which, in turn, is generally determined by the depth of weld in engagement with each of the planar surfaces from the line of juncture therebetween and by the depth of the weld at a bisecting angle between such surfaces. The measurement of such dimensions has long been a concern to the welding arts and many measuring devices have been proposed for such usage. Among the many patents relating to suggested constructions for such devices are U.S. Pat. Nos. 3,597,848; 4,545,124; 4,637,142; German Patent 626,528 and Swiss Patent 203,464.

While most of previously proposed fillet weld measuring devices accomplish the ultimate end of fillet weld dimension measurement, they are not particularly well adapted to rapid repetitive measurement, or to the rapid determination of whether a fillet weld meets specifications along its length as is required for precision weld inspection or for the accurate repetitive measurement of skewed fillet welds.

This invention may be briefly described an an improved construction for a fillet weld gauge which includes, in its broader aspects, rectilinear plate having at least one planar surface bounded by at least one base marginal perimetric edge, a plurality of elongate, uniformly-spaced-apart grooves in said surface disposed parallel to said base marginal perimetric edge, a cover plate overlying said planar grooved surface having a plurality of uniformly spaced elongate slots therein disposed in selective overlying longitudinally aligned relation with the grooves therein and a slide member disposed in each of said grooves and engageable through said overlying slots for permitted individual longitudinal extension displacement thereof within the grooves to extend the ends thereof externally of said base plate. In a further broad aspect, the invention preferentially includes the incorporation of such grooves on both the planar surfaces of said plate in offset spaced relation to each other, together with a second slotted cover plate and a second set of slide members to provide a compact structure of expanded measurement capacity. In a narrower aspect, the invention further includes an auxiliary depth gauge for measuring undercut depths or other recess depths on welded workpieces.

Among the advantages of the subject invention is a permitted simplicity of accurate fillet weld measurement both for individual and rapid repetitive measurement requirements attended by a permitted freedom from operator adjustment or critical positioning.

The object of this invention is the provision of an improved construction for fillet weld gauges.

Other objects and advantages of the subject invention will become apparent from the following portions of the specification, the claims and the appended drawings which disclose, in accordance with the mandate of the patent statutes, a preferred embodiment of a fillet weld measurement gauge that incorporates the principles of this invention.

Referring to the drawings:

FIG. 1 is an oblique view of a fillet weld gauge incorporating the principles of this invention;

FIG. 1A is an oblique view of a slide member;

FIG. 2A is a sectional view as taken on the line 2A—2A on FIG. 1;

FIG. 2B is a sectional view as taken on the line 2B—2B of FIG. 1;

FIG. 3 is a sectional view as taken on the line 3—3 of FIG. 2A;

Figure 4:
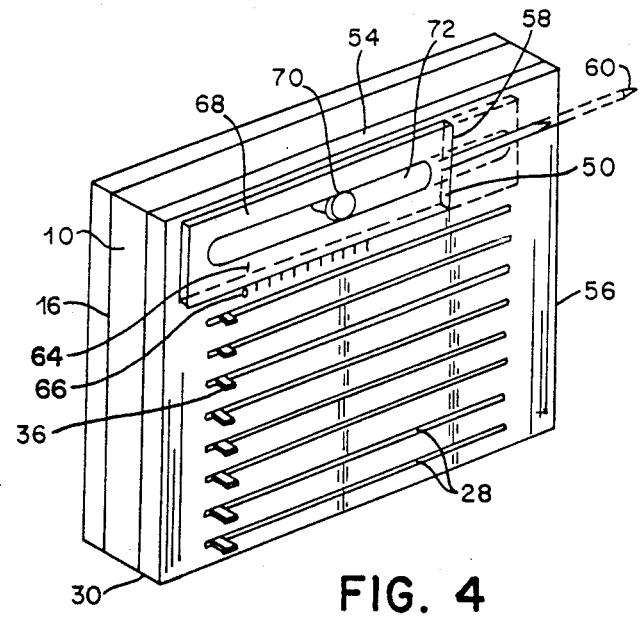
FIG. 4 is an oblique view of the obverse side of the gauge shown in FIG. 1.

Referring to the drawings and initially to FIGS. 1–3, there is provided a rectangular base plate 10 of uniform thickness having a first planar surface 12a bounded by a base marginal perimetric edge 14 and a side marginal perimetric edge 16 disposed perpendicular thereto. As shown in FIG. 2B, the obverse side of the base plate 10 has a second planar surface 12b disposed in parallel spaced relation to the first planar surface 12a. Embedded in each of the planar surfaces 12a and 12b are a plurality of spaced apart elongate grooves 20 disposed parallel to the base marginal edge 14. The grooves 20 extend to and through the side marginal edge 16 as at 22 and 23 but terminate a predetermined distance inwardly from the other side marginal edge 24, as best shown in FIGS. 2A and 2B. The grooves 20 are uniformly spaced apart on each planar surface 12a and 12b and are uniformly spaced apart relative to each other to increase the measurement capabilities of the gauge. By way of illustrative example, the grooves 20 on the first planar surface 12a may be spaced on ⅛ inch centers measured from the base marginal perimetric edge 14. In contradistinction thereto, the grooves 20 in the second planar surface 12b may be also spaced on ⅛ inch centers but are disposed in offset relation to the grooves 20 on the first planar surface 12a, as for example with the lowest groove therein being spaced 1/16 of an inch from the base marginal edge 14, as shown in FIG. 3. Disposed in overlying relation with each of the planar surfaces 12a and 12b are rectangular cover plates 26 and 30 whose perimetric edges are in alignment with the perimetric edges of the base plate 10. The cover plates each include a plurality of uniformly spaced narrow elongate slots 28 therein disposed on selective overlying longitudinal alignment with the axes of the grooves 20 in both of the planar surfaces of the base plate 10. Slideably disposed within each of the grooves 20 in either surface of the base plate 10 is an independently displaceable needle-like slide member 32. As shown in FIG. 1A, each slide member 32 includes a pointed dependent end 34 and a transversely extending ear or tab 36 at the other terminal end thereof. The transversely extending tabs 36 are sized to extend through the slots 28 in the cover plates 26 and 30, as shown in FIGS. 1 and 4, to permit individual manual projection and retraction of the needle-like slide members within the grooves 20 on either side of the gauge.

Figure 5C:
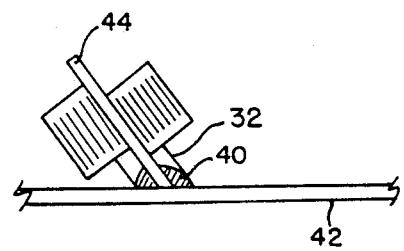
FIGS. 5A, 5B and 5C are schematic side elevational views illustrating usage of the gauge for measurement of crown height and theoretical throat of a fillet weld.
Figure 5B:
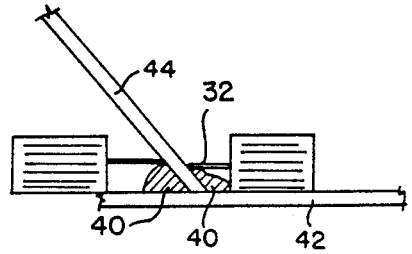
Figure 5A:
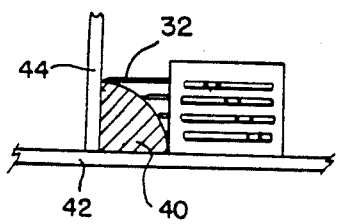

As shown in FIGS. 5A, 5B and 5C, the subject gauge functions in the nature of a profilometer in effecting fillet weld measurement. As there depicted, a fillet weld 40 joins one plate 42 to a second plate 44 disposed in varying angular relation thereto. In situations whee the plates 40 and 42 are disposed perpendicular to each other, as shown in FIG. 5A, the base marginal edge of the gauge is placed on the plate 42 with the side marginal perimetric edge 16 touching the weld 40 and the individual slides are displaced into engagement with the fillet weld 40 surface. Since the offset individual slides are each uniformly spaced apart a predetermined distance, for example ⅛ inch, the next spatial difference between the slides reduces to 1/16 inch and the height of a weld "L" may be readily determined by the identity of the particular slide member 32 that surmounts the weld. If desired, the exposed surface of the cover plate 26 may be graduated adjacent to the slots, as to 46, to visually indicate the amount of slide member displacement from a fully retracted position. In a similar manner, the gauge may be placed on the surface of plate 44 and the slides extended to measure the weld right along the surface of plate 42. FIGS. 5B and 5C schematically depict other dispositions of the gauge relative to welds for situations where the plates 40 and 42 are not perpendicular to each other.

The subject gauge also includes auxiliary means to measure the depth of undercuts or pits in a workpiece. To this end and as shown in FIG. 4, a channeled slide member 50 is slideably mounted on the rear cover plate 30 in proximity with the upper marginal perimetric edge 54 thereof. The slide member 50 is mounted so as to be lineally displaceable in a path parallel to the perimetric edge 54. Extending from leading end 58 of the slide 50 is a needle-like element 60. In the retracted position of the slide 50, the terminal end of the needle element 60 does not extend beyond the perimetric edge 56 of the cover plate 30 and conveniently may be in alignment therewith when the index mark 64 on the slide 50 is coincident with the "0" graduation 66 on the extension scale 68. In advanced position, as shown by the dotted lines in FIG. 4, the terminal end of the needle element 60 extends beyond the perimetric edge 56. The slide element 50 may be locked in position, retracted or advanced, by a thumbscrew 70 traversing the channel 72 in the slide element body portion.

Figure 6:
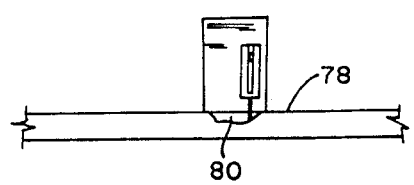
FIG. 6 is a schematic side elevational view showing usage of the gauge for measurement of pits or undercuts.

As shown in FIG. 6, the auxiliary undercut or pit gauge is utilized by placing the marginal perimetric edge 56 on a planar surface 78 and loosening the thumbscrew 70 to permit the slide member 50 to be advanced until the terminal end of the needle-like element 60 engages the surface of a recess or pit 80. After tightening of the thumbscrew 72 to prevent inadvertent slide displacement, the degree of needle member advance may be read from the scale 68.

As will be apparent, the slide assembly 50 could equally well be mounted on the cover plate 26; however, a preferred construction is as shown and described above.

Having thus described our invention, we claim:

1. A fillet weld measuring gauge comprising
   a base plate having at least one planar surface bounded by at least one linear base marginal perimetric edge,
   said linear base marginal perimetric edge supporting the gauge on a surface of a structural member adjacent to a fillet weld thereon for measuring the fillet weld,
   each said planar surface having a plurality of elongate uniformly spaced apart grooves embedded therein and disposed parallel to and in predetermined spaced measured relation with said base marginal edge,
   a cover plate overlying each said grooved planar surface having a plurality of uniformly spaced, elongate slots therein disposed in selective overlying longitudinally aligned relation with said grooves in said planar surface, and
   a slide member disposed in each of said grooves and engageable through said overlying slots in each said cover plate for permitted individual longitudinal displacement thereof within said grooves externally of said base plate into engagement with said fillet weld.

2. A fillet weld measurement gauge as set forth in claim 1 wherein each of said slide members has a first terminal end of pointed character displaceable externally of said base plate.

3. A fillet weld measurement gauge as set forth in claim 1 further including a channeled slide member mounted on said cover plate and displaceable in a direction parallel to that of said base marginal edge,
   a needle-like element extending from said channeled slide member and having its terminal end displaceable from a retracted location coincident with a second marginal perimetric edge of said base plate disposed perpendicular to said base marginal perimetric edge thereof to an extended location beyond said second marginal perimetric edge,
   scale means indicative of the extent of displacement of the terminal end of said needle-like element from its retracted location, and
   means normally securing said channeled slide member and terminal end of said needle-like element in retracted location.

4. A fillet weld measuring gauge comprising
   a base plate having a pair of planar surfaces disposed in parallel spaced apart relation commonly bounded by at least one linear base marginal perimetric edge,
   each said planar surface having a plurality of elongate uniformly spaced apart grooves embedded therein and disposed parallel to said base marginal edge,
   a cover plate overlying each said grooved planar surface having a plurality of uniformly spaced, elongated slots therein disposed in selective overlying longitudinally aligned relation with said grooves in said planar surface, and
   a slide member disposed in each of said grooves and engageable through said overlying slots in each said cover plate for permitted individual longitudinal displacement thereof within said grooves externally of said base plate.

5. A fillet weld measurement gauge as set forth in claim 4 wherein the grooves in one planar surface are disposed in offset relation to the grooves in the other planar surface thereof.

* * * * *